US012188428B2

(12) United States Patent
Niemeyer et al.

(10) Patent No.: US 12,188,428 B2
(45) Date of Patent: Jan. 7, 2025

(54) METHOD FOR THE MODEL-BASED OPEN-LOOP AND CLOSED-LOOP CONTROL OF AN INTERNAL COMBUSTION ENGINE

(71) Applicant: ROLLS-ROYCE SOLUTIONS GMBH, Friedrichshafen (DE)

(72) Inventors: Jens Niemeyer, Friedrichshafen (DE); Andreas Flohr, Deggenhausertal (DE); Jörg Remele, Hagnau (DE)

(73) Assignee: ROLLS-ROYCE SOLUTIONS GMBH, Friedrichshafen (DE)

( * ) Notice: Subject to any disclaimer, the term of this patent is extended or adjusted under 35 U.S.C. 154(b) by 53 days.

(21) Appl. No.: 16/623,264

(22) PCT Filed: Jun. 12, 2018

(86) PCT No.: PCT/EP2018/065457
§ 371 (c)(1),
(2) Date: Dec. 16, 2019

(87) PCT Pub. No.: WO2018/243093
PCT Pub. Date: Dec. 27, 2018

(65) Prior Publication Data

US 2023/0258144 A1 Aug. 17, 2023

(51) Int. Cl.
*F02D 41/38* (2006.01)
*F02D 41/14* (2006.01)

(52) U.S. Cl.
CPC ......... *F02D 41/38* (2013.01); *F02D 41/1401* (2013.01); *F02D 2041/1433* (2013.01); *F02D 2200/0602* (2013.01)

(58) Field of Classification Search
CPC ................. F02D 41/38; F02D 41/1401; F02D 2041/1433; F02D 2200/0602
(Continued)

(56) References Cited

U.S. PATENT DOCUMENTS 9,732,688 B2 8/2017 Cygan, Jr.
10,669,962 B2 * 6/2020 Buchholz ............ F02D 41/0047
(Continued)

FOREIGN PATENT DOCUMENTS

DE 102006004516 B3 3/2007
DE 102015104194 A1 10/2015
(Continued)

OTHER PUBLICATIONS

Harder Karsten et al: "A real-time nonlinear MPC scheme with emission constraints for heavy-duty diesel engines", 2017 American Control Conference (ACC), AACC, May 24, 2017 (May 24, 2017), pp. 240-245, XP033109918.

*Primary Examiner* — Hai H Huynh
(74) *Attorney, Agent, or Firm* — LUCAS & MERCANTI, LLP; Klaus P. Stoffel

(57) ABSTRACT

A method for the model-based open-loop and closed-loop control of an internal combustion engine, in which injection system set points for activating the injection system actuator are calculated as a function of a torque setpoint via a combustion model, and gas path set points for activating the gas path actuators are calculated via a gas path model. A measure of quality is calculated by an optimizer as a function of the injection system set points and the gas path set points. The measure of quality is minimized by the optimizer by changing the injection system set points and gas path set points within a prediction horizon. By using the minimized measure of quality, the injection system set points and gas path set points are set by the optimizer as definitive for adjusting the operating point of the internal combustion engine.

5 Claims, 4 Drawing Sheets

(58) Field of Classification Search
USPC ....... 123/299, 300, 672, 681, 682, 436, 472, 123/478–480; 701/103–105, 107, 110
See application file for complete search history.

(56) References Cited

U.S. PATENT DOCUMENTS

| | | | |
|---|---|---|---|
| 2011/0172897 | A1 | 7/2011 | Tsuzuki |
| 2016/0025020 | A1 | 1/2016 | Hodzen |
| 2018/0216558 | A1 | 8/2018 | Buchholz |

FOREIGN PATENT DOCUMENTS

| | | | |
|---|---|---|---|
| DE | 102014118125 | B3 | 5/2016 |
| DE | 102015212709 | A1 | 1/2017 |
| WO | 2017005337 | A1 | 1/2017 |
| WO | 2017102039 | A1 | 6/2017 |

* cited by examiner

METHOD FOR THE MODEL-BASED OPEN-LOOP AND CLOSED-LOOP CONTROL OF AN INTERNAL COMBUSTION ENGINE

CROSS-REFERENCE TO RELATED APPLICATIONS

The present application is a 371 of International application PCT/EP2018/065457, filed Jun. 12, 2018, which claims priority of DE 10 2017 005 783,4, filed Jun. 20, 2017, the priority of these applications is hereby claimed and these applications are incorporated herein by reference.

BACKGROUND OF THE INVENTION

The invention relates to a method for the model-based open-loop and closed-loop control of an internal combustion engine, in which injection system setpoint values for actuating the injection system actuators are calculated as a function of a setpoint torque by means of a combustion model, and gas path setpoint values for actuating the gas path actuators are calculated by means of a gas path model.

The behavior of an internal combustion engine is determined definitively by means of an engine control device as a function of a power request. For this purpose, corresponding characteristic curves and characteristic diagrams are applied in the software of the engine control unit. By means of said curves and diagrams the manipulated variables of the internal combustion engine, for example the start of injection and a necessary rail pressure, are calculated from the power request, for example a setpoint torque. These characteristic curves/characteristic diagrams are populated with data at the manufacturer of the internal combustion engine on a test bench. However, the large number of these characteristic curves/characteristic diagrams and the correlation of the characteristic curves/characteristic diagrams with one another give rise to a large amount of expenditure on coordination.

Therefore, in practice, attempts are made to reduce the expenditure on coordination by using mathematical models. For example, DE 10 2006 004 516 B3 describes a Bayesian network with probability tables for defining an injection quantity, and US 2011/0172897 A1 describes a method for adapting the start of injection and the injection quantity by means of neural networks and using combustion models. It is critical here that only trained data is modeled, which data firstly has to be learnt during a test bench run.

US 2016/0025020 A1 describes a model-based control method for the gas path of an internal combustion engine. The gas path comprises both the air side and the exhaust gas side together with exhaust gas recirculation. In a first step of the method, for example the charge air temperature or the NOx concentration, the current operating situation of the internal combustion engine, is ascertained from the measurement variables of the gas path.

In a second step, a quality measure within a prediction horizon is also calculated from the measurement variables by means of a physical model of the gas path. Then, in a third step, the actuation signals for the actuators of the gas path are in turn defined on the basis of the quality measure and the operating situation. The specified method relates exclusively to the gas path and is based on a linearized gas path model. As a result of the linearization, a loss of information is unavoidable.

SUMMARY OF THE INVENTION

The invention is therefore based on the object of developing a method for the model-based open-loop and closed-loop control of the entire internal combustion engine with a higher quality level.

The method consists in the fact that injection system setpoint values for actuating the injection system actuators are calculated as a function of a setpoint torque by means of a combustion model, and gas path setpoint values for actuating the gas path actuators are calculated by means of a gas path model and a quality measure is calculated by an optimizer as a function of the injection system setpoint values and the gas path setpoint values. This method further consists in the fact that the optimizer minimizes the quality measure by changing the injection system setpoint values and gas path setpoint values within a prediction horizon, and the injection system setpoint values and the gas path setpoint values are set by the optimizer on the basis of the minimized quality measure, as definitive for setting the operating point of the internal combustion engine.

The minimized quality measure is calculated in that the optimizer calculates a first quality measure at a first point in time, a second quality measure is predicted within the prediction horizon at a second point in time, and subsequently a difference is determined between the two quality measures. If the difference is smaller than a limiting value, the optimizer sets the second quality measure as a minimized quality measure. The consideration of the limiting values is in this respect an abort criterion, since further minimization would not lead to a more precise adaptation. Instead of the consideration of the limiting values, it is also possible to set a predefinable number of new calculations as an abort criterion.

On the basis of the minimum quality measure, the optimizer then indirectly predefines a rail pressure setpoint value as an injection system setpoint value for a subordinate rail pressure closed-loop control circuit, and directly predefines a start of injection and an end of injection for actuating an injector. In addition, the optimizer then indirectly predefines the gas path setpoint values, for example a lambda setpoint value, for a subordinate lambda closed-loop control circuit and an EGR setpoint value for a subordinate EGR closed-loop control circuit.

Both the combustion model and the gas path model model the system behavior of the internal combustion engine as mathematical equations. These are determined once on the basis of a reference internal combustion engine during a test bench run, referred to as the DoE test bench run (DoE: design of experiments) or from simulation trials. Since, for example, different emission targets can be formed for the same type of internal combustion engine, the expenditure on coordination is reduced decisively. Differentiation between a steady-state mode and a transient mode, for example when a load is applied in the generator mode is no longer necessary.

In addition, the setpoint torque is set precisely while complying with emission limiting values. The models can be coordinated individually, wherein the models together model the internal combustion engine. The previously necessary characteristic curves and characteristic diagrams can therefore be dispensed with.

BRIEF DESCRIPTION OF THE DRAWING

A preferred exemplary embodiment is illustrated in the figures, in which.

DETAILED DESCRIPTION OF THE INVENTION

Figure 1:
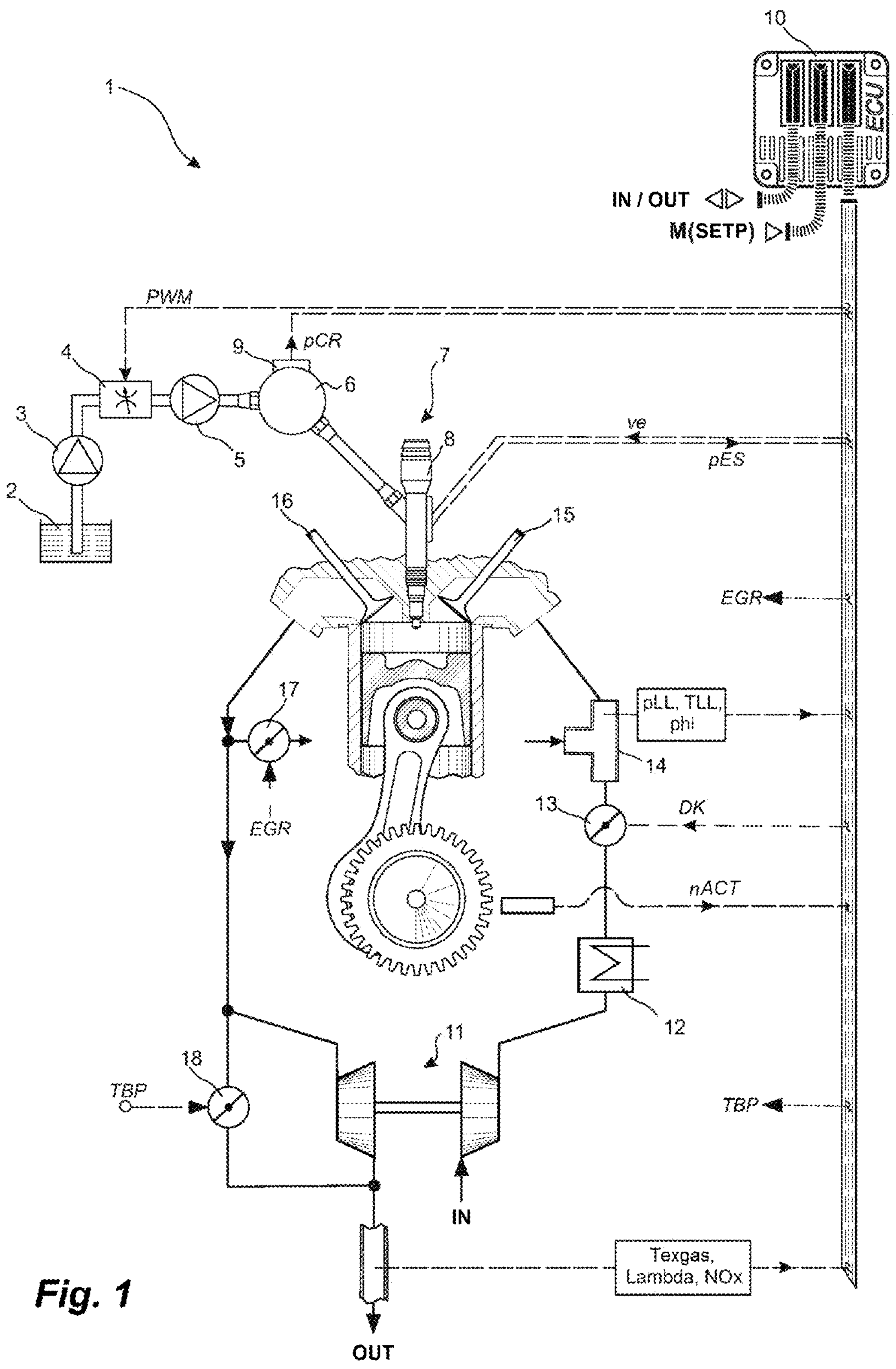
FIG. 1 shows a system diagram.

FIG. 1 shows a system diagram of an electronically controlled internal combustion engine 1 with a common rail system. The common rail system comprises the following mechanical components: a low-pressure pump 3 for delivering fuel from a fuel tank 2, a variable intake throttle 4 for influencing the through-flowing volume flow of fuel, a high-pressure pump 5 for feeding the fuel at increased pressure, a rail 6 for storing the fuel and injectors for injecting the fuel into the combustion chambers of the internal combustion engine 1. The common rail system can optionally also be embodied with individual accumulators, wherein an individual accumulator 8 is then integrated, for example, as an additional buffer volume in the injector 7. The further functionality of the common rail system is assumed to be known.

The illustrated gas path comprises both the air supply line and the exhaust gas discharge line. A charge air cooler 12, a throttle valve 13, a junction point 14 for combining the charge air with the recirculated exhaust gas and the inlet valve 15 are arranged in the air supply line of the compressors of an exhaust gas turbocharger 11. In addition to the outlet valve 16, an EGR actuator 17, the turbine of the exhaust gas turbocharger 11 and a turbine bypass valve 18 are arranged in the exhaust gas line.

The mode of operation of the internal combustion engine 1 is determined by an electronic control unit 10 (ECU). The electronic control unit 10 contains the customary components of a microcomputer system, for example a microprocessor, I/O modules, buffers and memory modules (EEPROM, RAM). In the memory modules, the operating data which are relevant for the operation of the internal combustion engine 1 are applied as models. The electronic control unit 10 calculates the output variables from the input variables by means of said models. FIG. 1 illustrates, by way of example, the following input variables: a setpoint torque M(SETP) which is predefined by means of an operator, the rail pressure pCR which is measured by means of a rail pressure sensor 9, the engine rotational speed nACT, the charge air pressure pLL, the charge air temperature TLL, the moisture phi of the charge air, the exhaust gas temperature Texgas, the air/fuel ratio lambda, the NOx actual value and optionally the pressure pES of the individual accumulator 8 and an input variable IN. The input variable IN includes the further sensor signals (not illustrated), for example the coolant temperatures. The following are presented in FIG. 1 as output variables of the electronic control unit 10: a signal PWM for actuating the intake throttle 4, a signal ve for actuating the injectors 7 (start of injection/end of injection), an actuation signal DK for actuating the throttle valve 13, an actuation signal EGR for actuating the EGR actuator 17, an actuation signal TBP for actuating the turbine bypass valve 18, and an output variable AUS. The output variable AUS is representative of other actuation signals for the open-loop and closed-loop control of the internal combustion engine 1, for example of an actuation signal for activating a second exhaust gas turbocharger during multistage charging.

Figure 2:
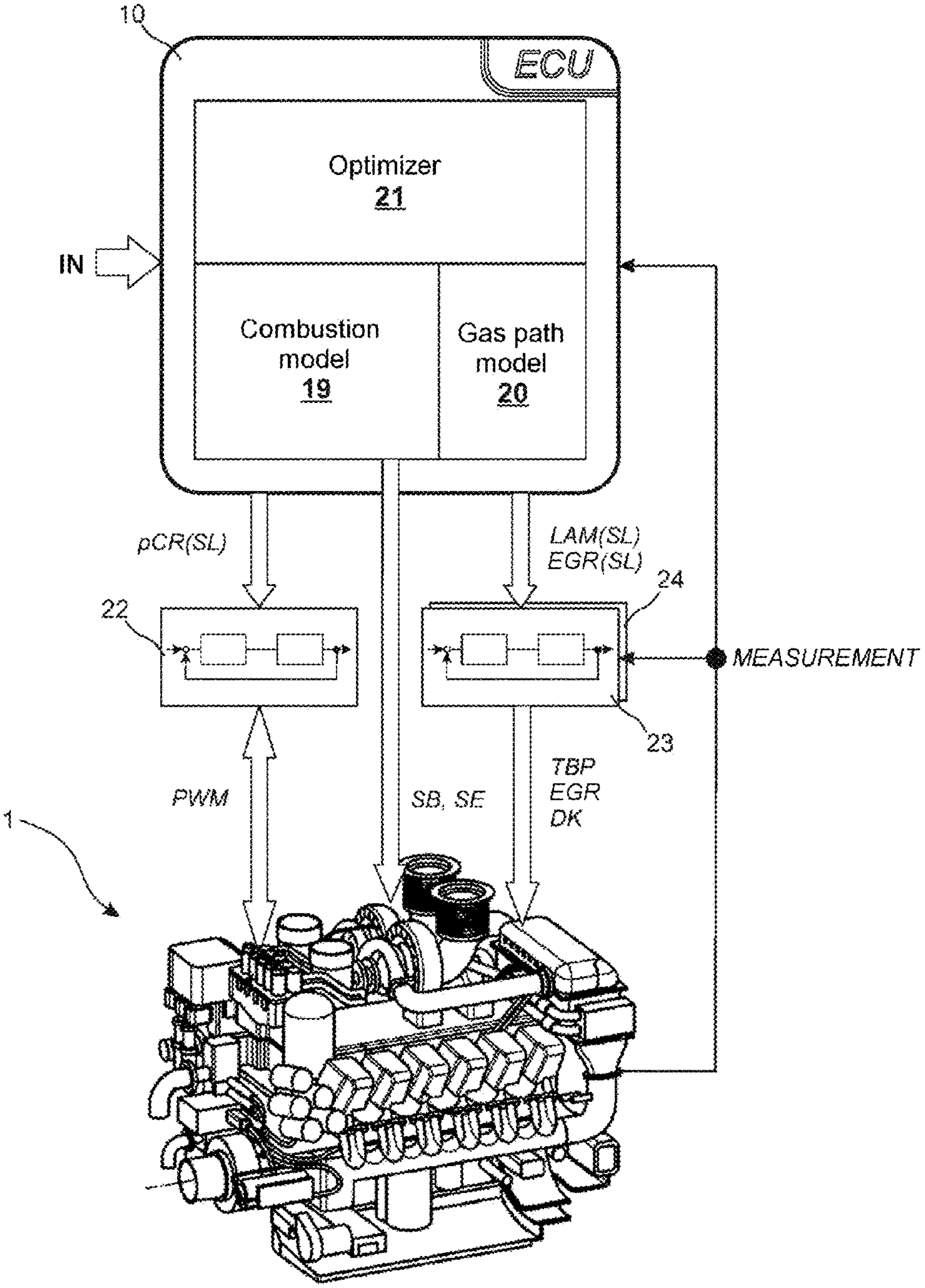
FIG. 2 shows a model-based system diagram.

FIG. 2 shows a model-based system diagram. In this illustration, a combustion model 19, a gas path model 20 and an optimizer 21 are indicated within the electronic control unit 10. Both the combustion model 19 and the gas path model 20 model the system behavior of the internal combustion engine as mathematical equations. The combustion model 19 statistically models the processes during the combustion. In contrast to this, the gas path model 20 models the dynamic behavior of the air supply line and of the exhaust gas line. The combustion model 19 contains individual models, for example for the generation of NOx and the generation of soot, for the exhaust gas temperature, for the exhaust gas mass flow and for the peak pressure. These individual models in turn depend on the peripheral conditions in the cylinder and the parameters of the injection. The combustion model 19 is determined in a reference internal combustion engine in a test bench 1, referred to as the DoE test bench run (DoE: design of experiments). In the DoE test bench run, operating parameters and manipulated variables are systematically varied with the objective of not being the entire behavior of the internal combustion engine in accordance with motor variables and environmental peripheral conditions.

The optimizer 21 evaluates the combustion model 19, specifically with respect to the setpoint torque M(SETP), the emission limiting values, the environmental peripheral conditions, for example the moisture phi of the charge air, and the operating situation of the internal combustion engine. The operating situation is defined by the engine rotational speed nACT, the charge air temperature TLL, the charge air pressure pLL etc. The function of the optimizer 21 consists then in evaluating the injection system setpoint values for actuating the injection system actuators and the gas path setpoint values for actuating the gas path actuators. In this context, the optimizer 21 selects that solution in which a quality measure is minimized. The quality measure is calculated as an integral of the quadratic setpoint actual deviations within the prediction horizon. For example in the form:

$$(1) J=\int[w1(NOx(\mathrm{SETP})-NOx(ACT))^2+[w2(M(\mathrm{SETP})-M(ACT))^2+[w3(\ldots)]+.$$

Here, w1, w2, and w3 signify a corresponding weighting factor. It is known that the nitrogen oxide emissions result from the moisture phi of the charge air, the charge air temperature, the start of injection SB and the rail pressure pCR.

The quality measure is minimized in that a first quality measure is calculated by the optimizer 21 at a first point in time, the injection system setpoint values and the gas path setpoint values are varied, and a second quality measure within the prediction horizon is predicted on the basis thereof. On the basis of the difference between the two quality measures, the optimizer 21 then defines a minimum quality measure and sets it as definitive for the internal combustion engine.

For the example illustrated in the figure these are the setpoint rail pressure pCR(SL), the start of injection SB and the end of injection SE for the injection system. The setpoint rail pressure pCR(SL) is the reference variable for the subordinate rail pressure closed-loop control circuit 22. The manipulated variable of the rail pressure closed-loop control circuit 22 corresponds to the PWM signal to be applied to the intake throttle. The start of injection SB and the end of injection SE are applied directly to the injector (FIG. 1: 7). For the gas path, the optimizer 21 indirectly determines the gas path setpoint values. In the illustrated example these are a lambda setpoint value LAM(SL) and an EGR setpoint value EGR(SL) to be predefined for the two subordinate closed-loop control circuits 23 and 24. The recirculated measurement variables MESS are read in by the electronic control unit 10. The measurement variables MESS are to be understood as both directly measured physical variables and as auxiliary variables which are calculated therefrom. In the illustrated example, the lambda actual value LAM(ACT) and the EGR actual value EGR(ACT) are read in.

Figure 3:
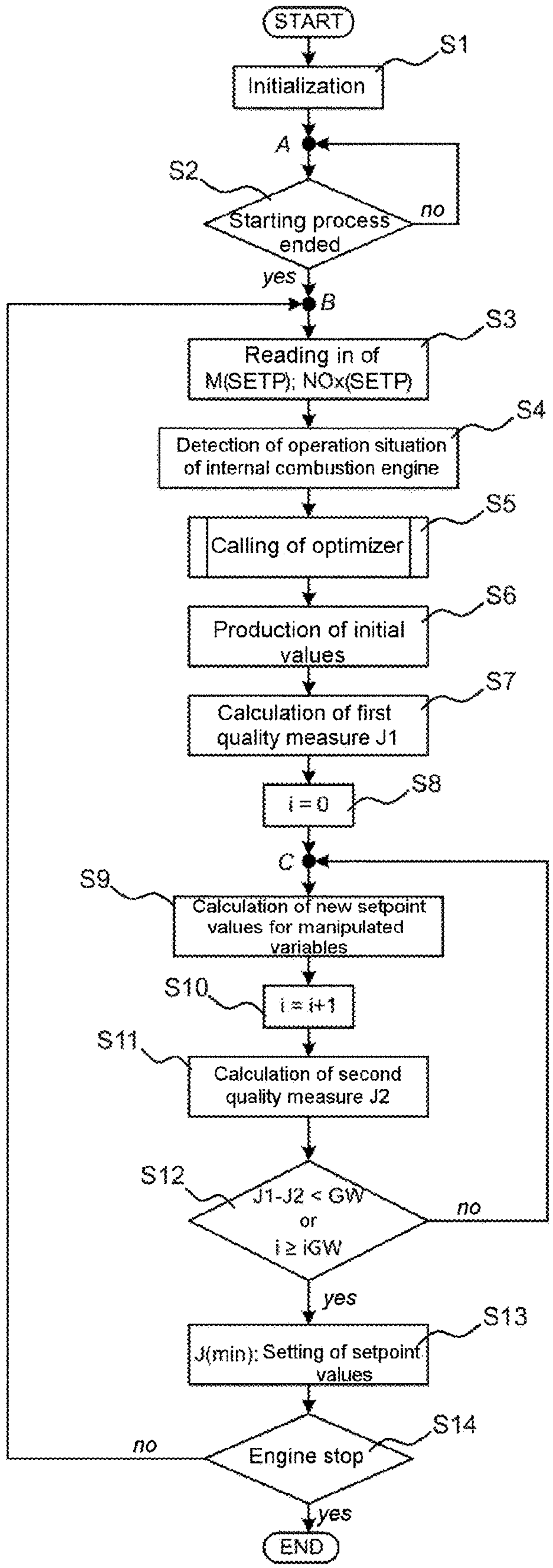
FIG. 3 shows a program flowchart.
Figure 4A:
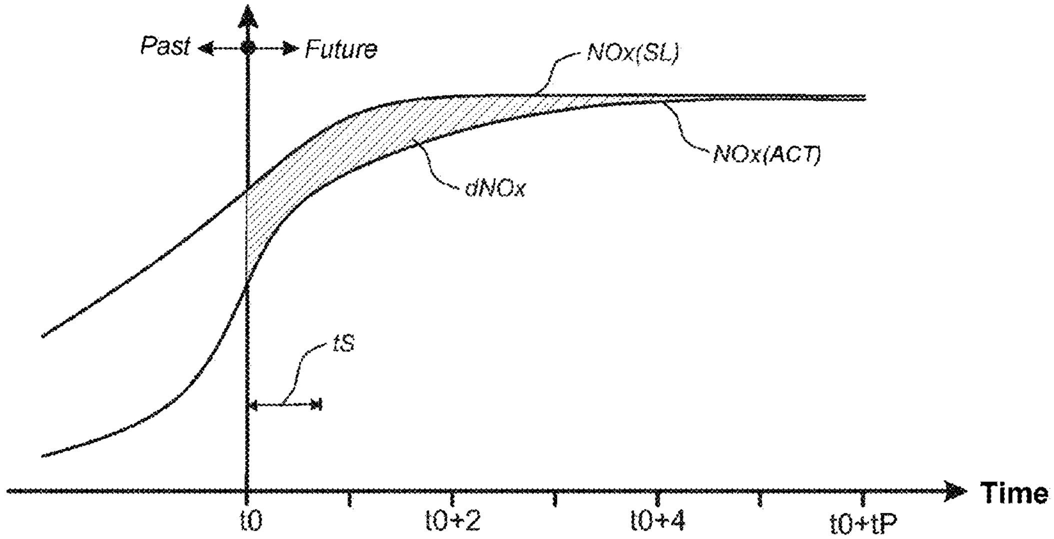
FIG. 4 shows time diagrams
Figure 4B:
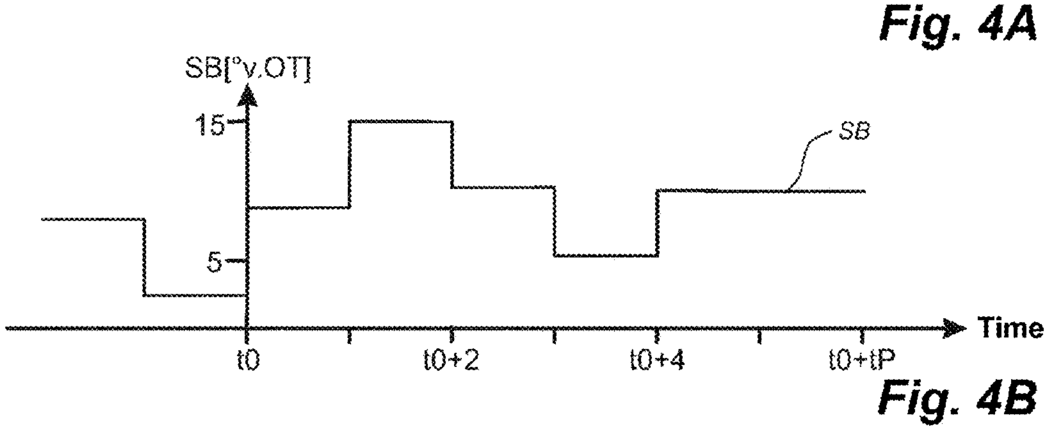
Figure 4C:
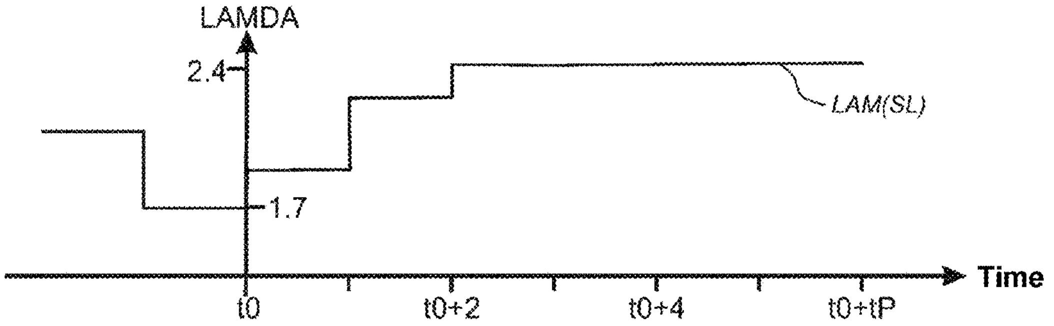
Figure 4D:
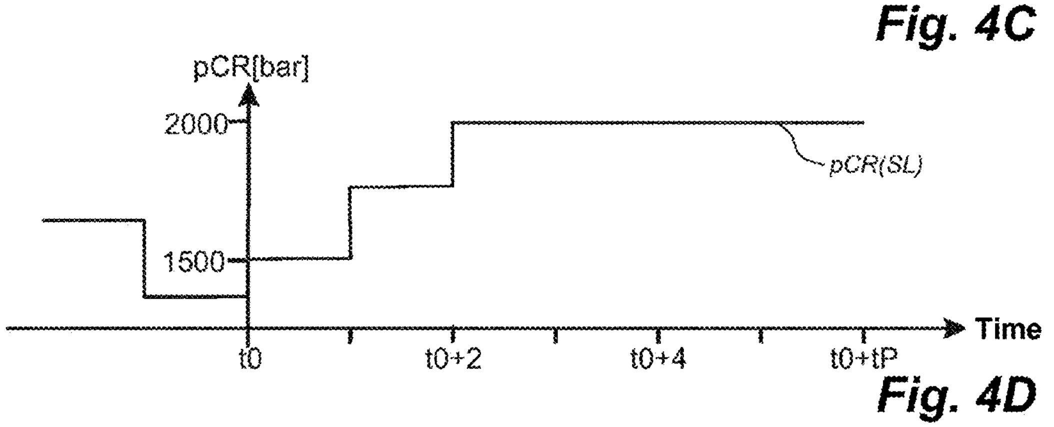

In FIG. 3, the method is illustrated in a program flowchart. After the initialization at S1, it is checked at S2 whether the starting process is ended. If it is still running, the interrogation result S2: no, the system jumps back to point A. If the starting process is ended, at S3 the setpoint torque M(SETP) which can be predefined by the operator and the NOx setpoint value NOx(SETP) are read in. Subsequent to this, at S4 the operating situation of the internal combustion engine is detected. The operating situation is defined by means of the measurement variables, in particular by means of the engine rotational speed nACT, the charge air temperature TLL, the charge air pressure pLL, the moisture phi of the charge air, etc. At S5, the subprogram optimizer is called and the initial values, for example the start of injection SB, are produced at S6. A first quality measure J1 is calculated on the basis of the equation (1) at S7, and a running variable i is set to zero at S8. Then, at S9 the initial values are changed and calculated as new setpoint values for the manipulated variables. At S10, the running variable i is increased by 1. On the basis of the new setpoint values, a second quality measure J2 is then predicted within the prediction horizon, for example for the next 8 seconds, at S11. At S12 the second quality measure J2 is in turn subtracted from the first quality measure J1 and compared with a limiting value GW. The further progress of the quality measure is checked by means of the formation of differences between the two quality measures. Alternatively, on the basis of the comparison of the running variable i with a limiting value iGW it is checked how after an optimization process has already been run through. The two limiting value considerations are in this respect an abort criterion for further optimization. If further optimization is possible, interrogation result S12: no, the system jumps back to point C. Otherwise, at S13 the optimizer sets the second quality measure J2 as a minimum quality measure J(min). The injection system setpoint values and the gas path setpoint values for predefinition for the corresponding actuators then result from the minimum quality measure J(min). Subsequent to this, at S14 it is checked whether an engine stop has been initiated. If this is not the case, interrogation result S14: no, the system jumps back to point B. Otherwise, the program flowchart is ended.

FIG. 4 illustrates a time diagram. FIG. 4 comprises the FIGS. 4A to 4D. Here, FIG. 4A shows the profile of the nitrogen oxide emission NOx, FIG. 4B shows the start of injection SB in degrees crankshaft angle before the top dead center (OT), FIG. 4C shows the profile of the lambda setpoint value LAM (SL), and FIG. 4D shows the setpoint rail pressure pCR(SL). The time domain before t0 corresponds to the past. The prediction horizon, for example 8s, corresponds to the time domain t0 to t0+tp. The term ts denotes a calculation time in which a new setpoint value, for example the start of injection SB, is output by the electronic control unit. In the illustrated example, a constant setpoint torque M(SETP) is assumed. At the point in time t0, the initial values of the start of injection SB=$8^{0}$, the lambda setpoint value LAM(SL)=1.9 and the setpoint rail pressure pCR(SL)=1500 bar are set. The NOx setpoint value profile NOx(SL) is predefined in FIG. 4A. A correspondingly large setpoint/actual difference dNOx results from these initial values, see FIG. 4A. The NOx actual value is calculated in accordance with the measured air pressures in the air path and the start of injection SB. The optimizer uses the equation (1) to calculate a first quality measure J1 at the point in time t0. Subsequently, the optimizer calculates how a change in the start of injection SB, the lambda setpoint value LAM (SL) and the setpoint rail pressure pCR(SL) within the prediction horizon (t0+tp) would act on the setpoint/actual difference dNOx, for example by increasing the setpoint rail pressure successively up to pCR(SL)=2000 bar. The optimizer determines the second quality measure J2 at each of the illustrated points in time. By subtracting the two quality measures and by means of the consideration of the limiting value, the quality measure is then minimized, that is to say it is checked whether a further optimization process is promising. For the illustrated example, the optimizer determines a minimum quality measure for the time t0+4, which is reflected in FIG. 4A in the approximation of the NOx actual value NOx(ACT) to the NOx setpoint value NOx (SL).

LIST OF REFERENCE NUMBERS

1 Internal combustion engine
2 Fuel tank
3 Low pressure pump
4 Intake throttle
5 High pressure pump
6 Rail
7 Injector
8 Individual accumulator
9 Rail pressure sensor
10 Electronic control unit
11 Exhaust gas turbocharger
12 Charge air cooler
13 Throttle valve
14 Junction point
15 Inlet valve
16 Outlet valve
17 EGR actuator (EGR=exhaust gas recirculation)
18 Turbine bypass valve
19 Combustion model
20 Gas path model
21 Optimizer
22 Rail pressure closed-loop control circuit
23 Lambda closed-loop control circuit
24 EGR closed-loop control circuit

The invention claimed is:

1. A method for model-based open-loop and closed-loop control of an internal combustion engine, comprising the steps of: calculating injection system setpoint values for actuating injection system actuators as a function of a setpoint torque by a combustion model; calculating gas path setpoint values for actuating gas path actuators by a gas path model; calculating a quality measure by an optimizer as a function of the injection system setpoint values and the gas path setpoint values, the optimizer minimizing the quality measure by changing the injection system setpoint values and gas path setpoint values within a prediction horizon; and setting the injection system setpoint values and the gas path setpoint values by the optimizer based on the minimized quality measure, as definitive for setting an operating point of the internal combustion engine, including minimizing the quality measure by the optimizer calculating a first quality measure at a first point in time, predicting a second quality measure within the prediction horizon at a second point in time, determining a difference between the first quality measure and the second quality measure, and setting, via the optimizer, the second quality measure as a minimized quality measure in which the deviation is smaller than a limiting value, wherein the optimizer directly predefines, as an injection system setpoint value, a rail pressure setpoint value for a subordinate rail pressure closed-loop control circuit.

2. The method according to claim 1, wherein the optimizer directly predefines a start of injection and an end of injection as injection system setpoint values for actuating an injector.

3. The method according to claim 1, wherein the optimizer indirectly predefines gas path setpoint values for subordinate gas path closed-loop control circuits.

4. A method for model-based open-loop and closed-loop control of an internal combustion engine, comprising the steps of: calculating injection system setpoint values for actuating injection system actuators as a function of a setpoint torque by a combustion model;

calculating gas path setpoint values for actuating gas path actuators by a gas path model; calculating a quality measure by an optimizer as a function of the injection system setpoint values and the gas path setpoint values, the optimizer minimizing the quality measure by changing the injection system setpoint values and gas path setpoint values within a prediction horizon; and setting the injection system setpoint values and the gas path setpoint values by the optimizer based on the minimized quality measure, as definitive for setting an operating point of the internal combustion engine, including minimizing the quality measure by the optimizer calculating a first quality measure at a first point in time, predicting a second quality measure within the prediction horizon at a second point in time, and setting, via the optimizer, the second quality measure as a minimized quality measure after running through a predefinable number of new calculations, wherein the optimizer directly predefines, as an injection system setpoint value, a rail pressure setpoint value for a subordinate rail pressure closed-loop control circuit.

5. The method according to claim 4, wherein the optimizer directly predefines a start of injection and an end of injection as injection system setpoint values for actuating an injector.

* * * * *